US011383619B2

(12) United States Patent
Cha et al.

(10) Patent No.: US 11,383,619 B2
(45) Date of Patent: Jul. 12, 2022

(54) INTERIOR VARIABLE VEHICLE

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 231 days.

(21) Appl. No.: 16/993,972

(22) Filed: Aug. 14, 2020

(65) Prior Publication Data

US 2021/0291701 A1 Sep. 23, 2021

(30) Foreign Application Priority Data

Mar. 17, 2020 (KR) .................. 10-2020-0032441

(51) Int. Cl.
*B60N 2/005* (2006.01)
*B60K 35/00* (2006.01)
(Continued)

(52) U.S. Cl.
CPC .............. *B60N 2/005* (2013.01); *B60K 35/00* (2013.01); *B60N 2/0155* (2013.01); *B60N 2/01508* (2013.01); *B60N 2/0727* (2013.01); *B60N 2/0735* (2013.01); *B60N 2/0742* (2013.01); *B60N 2/0745* (2013.01); *B60N 2/14* (2013.01); *B60R 3/02* (2013.01);
(Continued)

(58) Field of Classification Search
CPC ................. B60R 2013/0293; B60K 35/00; B60N 2/005; B60N 2/0735
USPC ...................... 296/65.11, 65.13, 70
See application file for complete search history.

(56) References Cited

U.S. PATENT DOCUMENTS 10,665,140 B1 * 5/2020 Ahn ................. B60Q 1/085
11,267,368 B2 * 3/2022 Prozzi .............. B60N 2/01516
(Continued)

FOREIGN PATENT DOCUMENTS

CN       110371057 A  * 10/2019 ............ B60K 35/00
DE  102019116552 A1 * 12/2019 ........... B60N 2/0292
(Continued)

*Primary Examiner* — Timothy J Brindley
(74) *Attorney, Agent, or Firm* — Morgan, Lewis & Bockius LLP

(57) ABSTRACT

An internal variable vehicle may include instrument panels provided on a side of an internal space of the vehicle, having a structure in which a portion thereof overlaps, configuring an embedding portion of the internal space when being developed, and forming an opening through which the internal space of the vehicle is externally exposed out of the vehicle when the portion thereof overlaps; a seat movable from the internal space of the vehicle to the outside; a guide provided on a floor of the internal space of the vehicle, and providing a path in which the seat is movable from the internal space of the vehicle to an opening side of the instrument panels; and a fixing module configured of fixing the seat to one point of the guide and releasing the fixing of the seat from the point of the guide when the seat is required to move to the outside of the vehicle through the opening of the instrument panels.

16 Claims, 5 Drawing Sheets

(51) Int. Cl.
- *B60R 3/02* (2006.01)
- *B60N 2/14* (2006.01)
- *B60N 2/015* (2006.01)
- *B60N 2/07* (2006.01)
- *B60R 13/02* (2006.01)
- *B60N 2/02* (2006.01)

(52) U.S. Cl.
CPC ............... *B60N 2002/0256* (2013.01); *B60N 2002/0272* (2013.01); *B60R 2013/0293* (2013.01)

(56) References Cited

U.S. PATENT DOCUMENTS

| | | | |
|---|---|---|---|
| 2005/0146186 A1* | 7/2005 | Kinnou | B60N 2/28 297/331 |
| 2020/0009991 A1* | 1/2020 | Ahn | B60N 2/01 |
| 2020/0171982 A1* | 6/2020 | Dry | B60N 2/005 |
| 2022/0063450 A1* | 3/2022 | Cha | B60N 2/06 |
| 2022/0144141 A1* | 5/2022 | Kondrad | B60N 2/005 |

FOREIGN PATENT DOCUMENTS

| | | |
|---|---|---|
| JP | 2001-239888 A | 9/2001 |
| JP | 3719188 B2 | 11/2005 |
| JP | 2006-347514 A | 12/2006 |
| JP | 5119731 B2 | 1/2013 |
| JP | 6337756 B2 | 8/2018 |
| KR | 10-0289260 B1 | 2/2001 |
| KR | 100381227 B1 | 4/2003 |

\* cited by examiner

INTERIOR VARIABLE VEHICLE

CROSS REFERENCE TO RELATED APPLICATION

The present application claims priority to Korean Patent Application No. 10-2020-0032441, filed Mar. 17, 2020, the entire contents of which is incorporated herein for all purposes by this reference.

BACKGROUND OF THE INVENTION

Field of the Invention

The present invention relates to an internal variable vehicle having a seat which may access the outside of the vehicle by including instrument panels configured for forming an opening that exposes an internal space of the vehicle to the outside, and a movable seat.

Description of Related art

A traditional concept's vehicle protects the safety of the occupants and performs air conditioning of an internal space by blocking the internal space in which people are boarding from the outside. However, in the case of a convertible, a portion of a vehicle body is selectively opened to expose the internal space of the vehicle to the outside, and in the case of such a convertible, a ceiling of the vehicle is mostly limited to be opened.

Furthermore, the traditional seat is fixed to a floor of the vehicle and is configured to look forward thereof. However, as autonomous driving technology configured for self-driving without driver intervention is actively developed, a shape of the seat is also expected to change.

The vehicle developed upwards to date has been limited to opening the ceiling even if a portion of the vehicle body is selectively open, and a purpose thereof was not a practical purpose, but a simple aesthetic purpose. Furthermore, it is expected that the seating arrangement and boarding posture will change with the development of autonomous driving technology, but the seat is only at the level of repositioning inside the vehicle.

Modern cars are expected to evolve into living spaces, not just transportation. To realize a future vehicle which is docked so that the vehicle is connected to the inside of the building, and the seat moves into the building to be in close contact with residential and office spaces beyond parking the vehicle outside the building and the people getting off the vehicle as at present, it is necessary to develop a portion of the vehicle body which is openable and a seat which is movable to the outside of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an internal variable vehicle in which instrument panels form an opening exposed to the outside of a vehicle, and a seat is movable and is selectively fixed, accessible the outside of the vehicle.

According to an exemplary embodiment of the present invention, an internal variable vehicle includes: instrument panels provided on a side of an internal space of the vehicle, having a structure in which a portion thereof overlaps, configuring an embedding portion of the internal space when being developed, and forming an opening through which the internal space of the vehicle is externally exposed out of the vehicle when the portion thereof overlaps; a seat movable from the internal space of the vehicle to the outside; a guide provided on a floor of the internal space of the vehicle, coupled to a lower end portion of the seat, and providing a path in which the seat is movable from the internal space of the vehicle to an opening side of the instrument panels; and a fixing module configured of fixing the seat to one point of the guide and releasing the fixing of the seat from the point of the guide when the seat is required to move to the outside of the vehicle through the opening of the instrument panels.

The internal variable vehicle may further include a side step provided at a predetermined point of the vehicle where the opening is formed outside the vehicle and opened between the opening and the ground when the seat moves to the outside of the vehicle to assist the seat to be seated on the ground.

The side step may be hingedly coupled to a side of the vehicle to form a portion of a vehicle body, and may be hingedly rotated when being opened to form the opening.

The seat may be provided with moving portions inserted into the guide on a bottom portion thereof, and may be movable along the guide by a driving member when the fixing module releases the fixing of the seat.

The fixing module may include a fixing portion provided inside the floor, inserted into the floor, protruding upwardly from the floor when fixing the seat, and coupled to a lower surface of the seat to fix the seat.

The guide may be fixed to the floor in a form surrounding supports of the seat when the seat is fixed, and at least a portion of the guide may be detached from the supports of the seat when the seat is released to release the fixing of the seat.

The fixing module may include a position sensor, and in a response that the seat is positioned at a fixed one point according to a detection signal of the position sensor, the fixing module may fix the seat.

The guide may be formed on the opposite side of the opening to prevent interference by moving a seat adjacent to the seat moving to the outside of the vehicle to a rear of the vehicle.

The instrument panels may include lower panels inclined in a predetermined angle with the floor and upper panels provided on the lower panels, and the upper panels and the lower panels may form the opening by overlapping the upper panels to each other and overlapping the lower panels to each other, respectively.

When the opening is formed, the upper panels may have a structure in which a portion thereof is stacked and overlapped on an upper portion of the remaining portion.

The lower surfaces of the upper panels may be provided with one or more support bars having a structure separated into both sides to reinforce a rigidity of the upper panels, and the support bars may be separated when the upper panels are stacked and overlapped and may be folded together with the upper panels.

The lower panels may have a sliding structure and overlap in one direction to form the opening.

The methods and apparatuses of the present invention have other features and advantages which will be apparent from or are set forth in more detail in the accompanying

Figure 1:
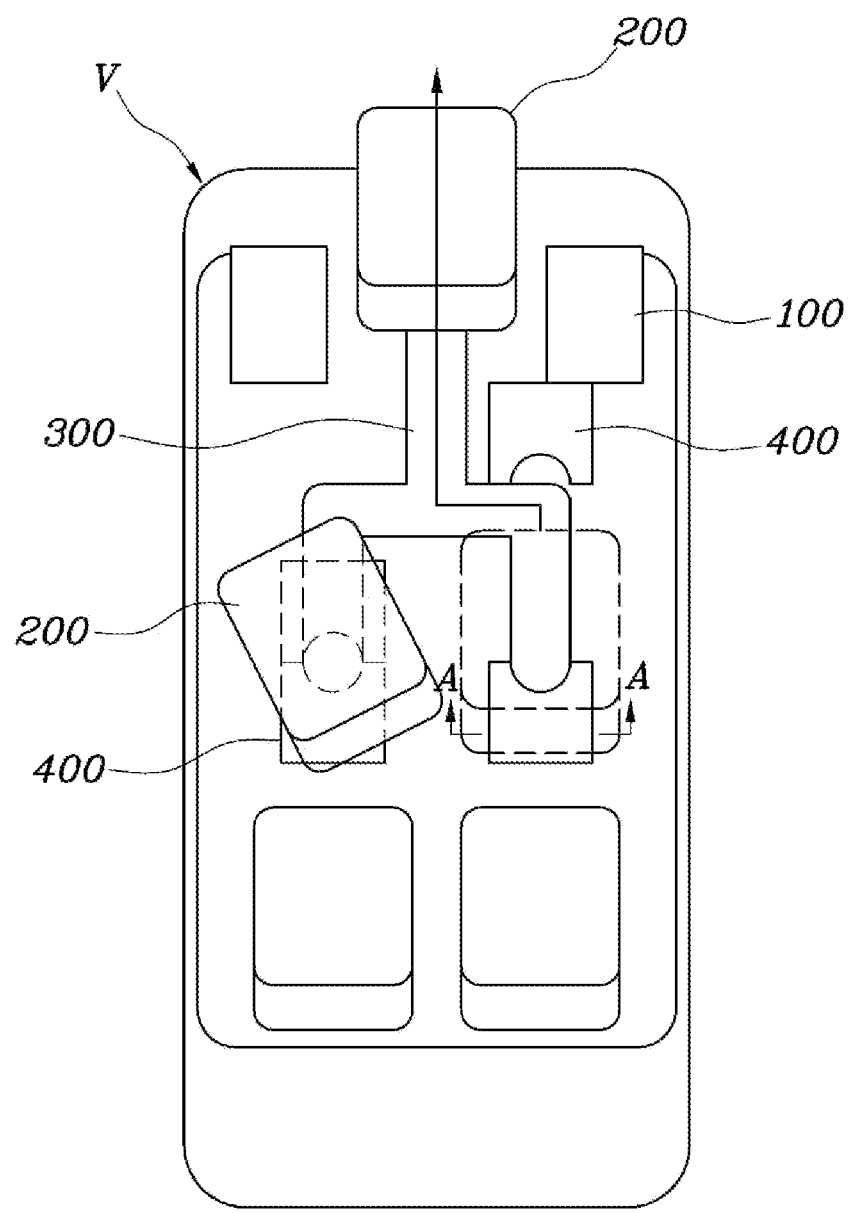
FIG. 1 is a view exemplarily illustrating a figure in which a seat in an internal variable vehicle according to an exemplary embodiment of the present invention is moved to the outside of the vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions will be provided only to describe various embodiments of the present invention included in the exemplary embodiment or application. Therefore, the exemplary embodiments of the present invention may be implemented in various forms, and are not to be interpreted as being limited to exemplary embodiments described in the exemplary embodiment or application.

Since the exemplary embodiments of the present invention may be variously modified and may have several forms, specific embodiments will be illustrated in the accompanying drawings and will be described in detail in the exemplary embodiment or application. However, this is not intended to limit the exemplary embodiment according to the concept of the present invention to a specific disclosure form, and it may be understood to include all modifications, equivalents, or substitutes included in the spirit and scope of the present invention.

Terms such as 'first', 'second', etc., may be used to describe various components, but the components are not to be construed as being limited to the terms. The terms are used only to distinguish one component from another component. For example, the first component may be referred to as the second component, and similarly, the second component may also be referred to as the first component, without departing from the scope of the present invention.

Hereinafter, embodiments of the present invention will be described in detail with reference to the accompanying drawings. Like reference numerals provided in each drawing denote like components.

The present invention relates to an internal variable vehicle in which an internal space of the vehicle is opened to form an opening 150 exposed to the outside of the vehicle, and a seat 200 is movable outside through the opening 150. The present invention relates to a modern vehicle in which the vehicle evolves as a portion of a living space from a simple transportation by suggesting a concept that the vehicle is docked in an interior of a building and a seat 200 may directly move from the vehicle to an office space or residential space.

FIG. 1 is a view exemplarily illustrating a figure in which a seat 200 in an internal variable vehicle according to an exemplary embodiment of the present invention is moved to the outside of the vehicle. Referring to FIG. 1, an internal variable vehicle according to an exemplary embodiment of the present invention may include instrument panels 100, a guide 300, and a fixing module 400.

The instrument panels 100 may be provided on one side of the internal space of the vehicle. When the instrument panels 100 are opened, the internal space of the vehicle may be exposed to the outside of the vehicle to form an opening 150 through which the seat 200 may access.

The instrument panel 100 may have a structure in which portions thereof overlap to form the opening 150. When the instrument panels 100 are developed, an embedding portion of the internal space is configured, and when some of the instrument panels 100 overlap, the opening 150 through which the internal space is exposed to the outside of the vehicle is formed.

The instrument panels 100 may include upper panels 110 formed horizontally with a floor of the vehicle and lower panels 120 formed while forming a certain angle with the floor, and details thereof will be described later.

The seat 200 is fixed to the vehicle by the fixing module 400, and when the fixing is released, the seat 200 may be formed to be movable from the internal space of the vehicle to the outside. The seat 200 may have the same shape and function as the seat 200 of a general vehicle except for a movable function.

The guide 300 may perform a function of providing a movement path in which the seat 200 moves in the internal space of the vehicle. The guide 300 is provided on the floor of the internal space of the vehicle, and may be coupled to a lower end portion of the seat 200. The seat 200 may be coupled to the guide 300 in a form in which a portion of the lower end portion of the seat 200 is inserted into the guide 300, and the seat 200 may move to an opening 150 side of the instrument panels 100 in the internal space of the vehicle along the guide 300.

Furthermore, a portion of the guide 300 may be formed on the opposite side of the opening 150. Since the guide 300 is partially formed on the opposite side of the opening 150, the seat 200 may be configured to be movable to the opposite side where the instrument panels 100 are formed. Therefore, when the seat 200 moves to the outside of the vehicle, a seat 200 adjacent to the moving seat 200 may be moved to the opposite side of the opening 150 so as not to interfere. As illustrated in FIG. 1, the seat 200 adjacent to the seat 200 moving to the outside of the vehicle is rotated or moved to prevent interference.

In an exemplary embodiment of the present invention, a distal end of the guide 300 is branched into at least two paths.

The fixing module 400 may perform a function of selectively fixing the seat 200 to the vehicle. The fixing module 400 may fix the seat 200 at one point of the guide 300, and then release the fixing when the seat 200 moves to enable movement.

Referring to FIG. 1, the fixing module 400 is configured to surround a support 210 provided at the lower end portion of the seat 200 to fix the seat 200 to the floor. In the case of releasing the fixing, a portion of the fixing module 400 may be detached from the support 210 to release the fixing. In FIG. 1, a seat 200 disposed on the right side of a first column illustrates a state in which a portion of the fixing module 400 is detached from the support 210 and the fixing is released.

In an exemplary embodiment of the present invention, the fixing module 400 is electrically connected to a controller to control operation thereof.

Figure 2:
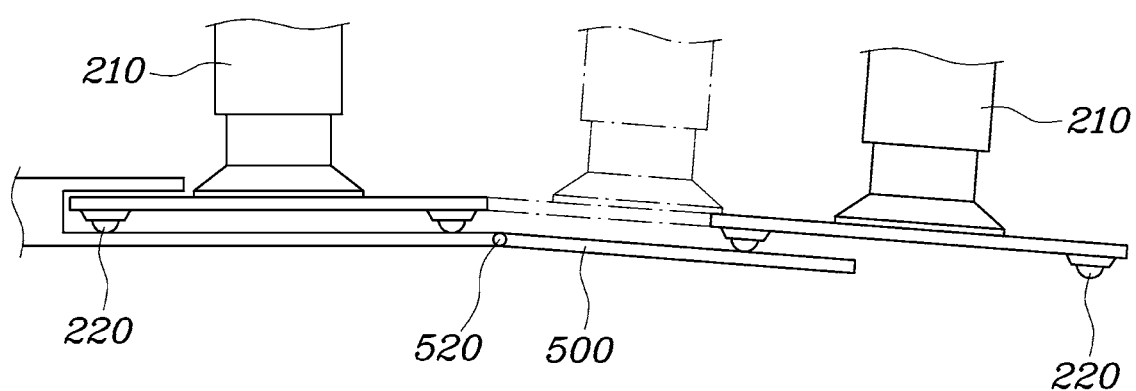
FIG. 2 is a view exemplarily illustrating a figure in which the seat of the internal variable vehicle according to an exemplary embodiment of the present invention is moved to the outside of the vehicle by a side step.

FIG. 2 is a view exemplarily illustrating a figure in which the seat 200 of the internal variable vehicle according to an exemplary embodiment of the present invention is moved to the outside of the vehicle by a side step 500.

Referring to FIG. 2, the internal variable vehicle according to an exemplary embodiment of the present invention may further include a side step 500 to assist the seat 200 to be seated on the ground when the seat 200 moves to the outside of the vehicle. In a case in which a spaced space between the vehicle and the ground exists or a height difference between a vehicle body and the ground exists, when the seat 200 moves from the vehicle to the outside, the seat 200 may be stably seated on the ground through side steps 500. As illustrated in FIG. 2, the side step 500 selectively protrudes to the outside of the vehicle body and is disposed on a path through which the seat 200 moves, assisting the seat 200 to stably move.

The side step 500 is provided at a point where the opening 150 is formed on the outside of the vehicle, and when the instrument panels 100 overlap to form the opening 150, the side step 500 may be formed to be exposed between the vehicle and the ground. The side step 500 may be hingedly 520 coupled to a side of the vehicle to form a portion of the vehicle body, and may be hingedly 520 rotated when being opened to form the opening 150.

Furthermore, as illustrated in FIG. 2, moving portions 220 inserted into the guide 300 may be provided under the seat 200. A wheel may be formed in the driving member 220, and when the opening 150 is formed, the seat 200 may be moved to the outside of the vehicle by the moving portions 220.

In an exemplary embodiment of the present invention, the moving portions 220 is equipped with a driving unit and a control unit to control the driving unit to move the seat 200 from a position to another position.

Figure 3:
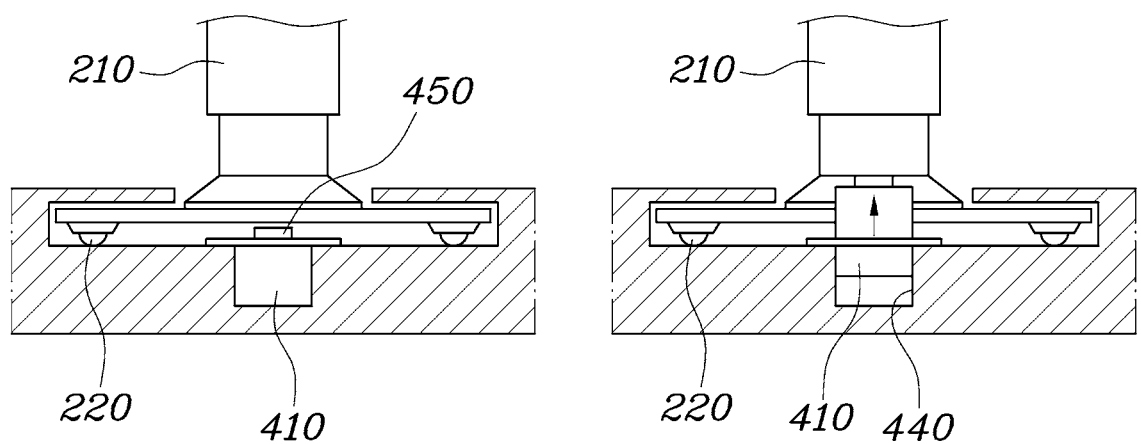
FIG. 3 is a view exemplarily illustrating a figure in which the seat of the internal variable vehicle according to an exemplary embodiment of the present invention is fixed by a fixing module.

FIG. 3 is a view exemplarily illustrating a figure in which the seat 200 of the internal variable vehicle according to an exemplary embodiment of the present invention is fixed by the fixing module 400.

FIG. 3 is a cross-sectional view taken along line A-A of FIG. 1. Referring to FIG. 3, the fixing module 400 may include a fixing portion 410 provided inside the floor, inserted into the floor, protruding upwardly from the floor when fixing the seat 200, and coupled to a lower surface of the seat 200. A groove 440 recessed inwardly so that the fixing portion 410 may be inserted may be formed on the lower surface of the seat 200.

Furthermore, the fixing module 400 may further include a position sensor 450. The position sensor 450 may recognize whether or not the seat 200 is positioned at a fixed point by detecting the position of the seat 200. If the position sensor 450 recognizes that the seat 200 is positioned at the fixed one point, the fixing module 400 may fix the seat 200. When the seat 200 is positioned at a correct fixed position by the position sensor 450, the seat 200 may be fixed by the fixing module 400.

In an exemplary embodiment of the present invention, the fixing module 400 may include an electric, mechanical or pneumatic actuator connected to a controller to move the fixing module 400 according a control signal of a controller connected to the fixing module 400.

Figure 4:
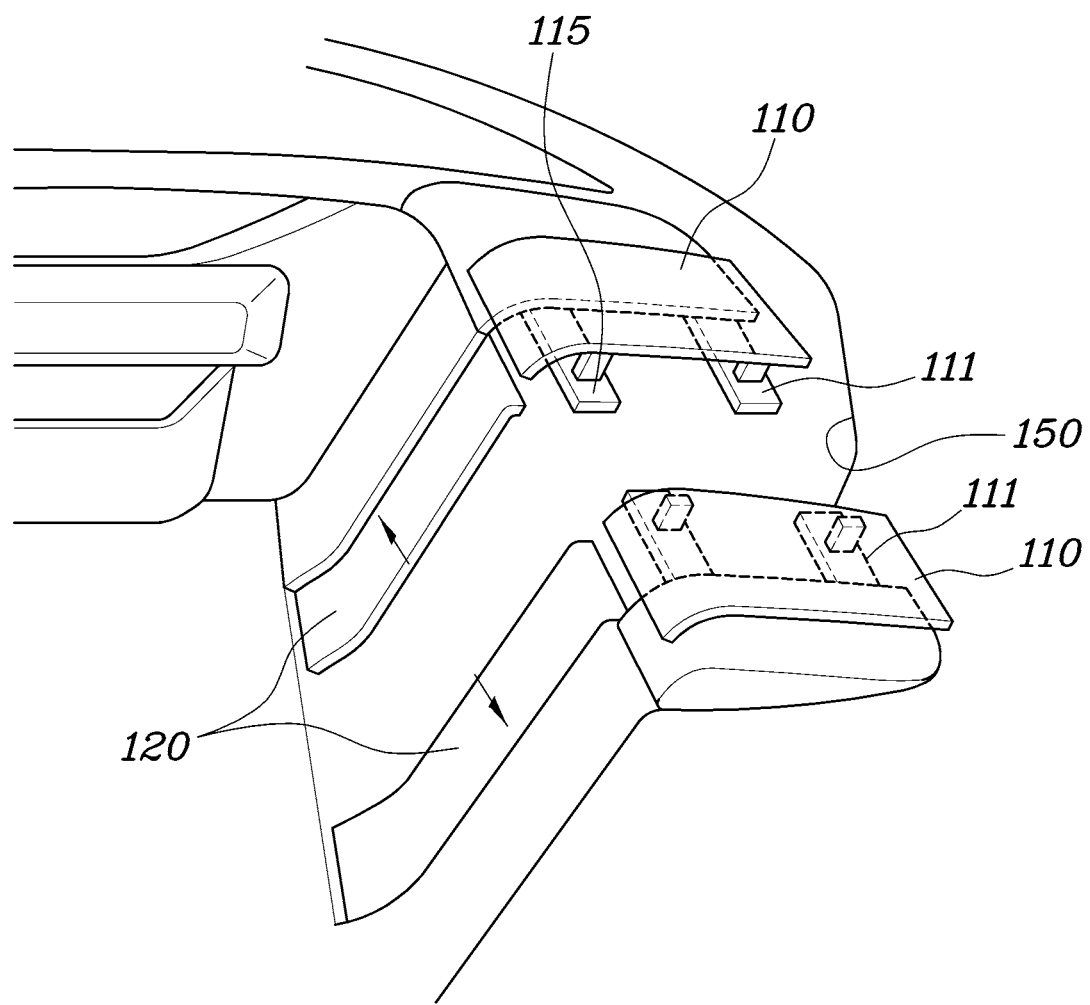
FIG. 4 is a perspective view of instrument panels of the internal variable vehicle according to an exemplary embodiment of the present invention.
Figure 5:
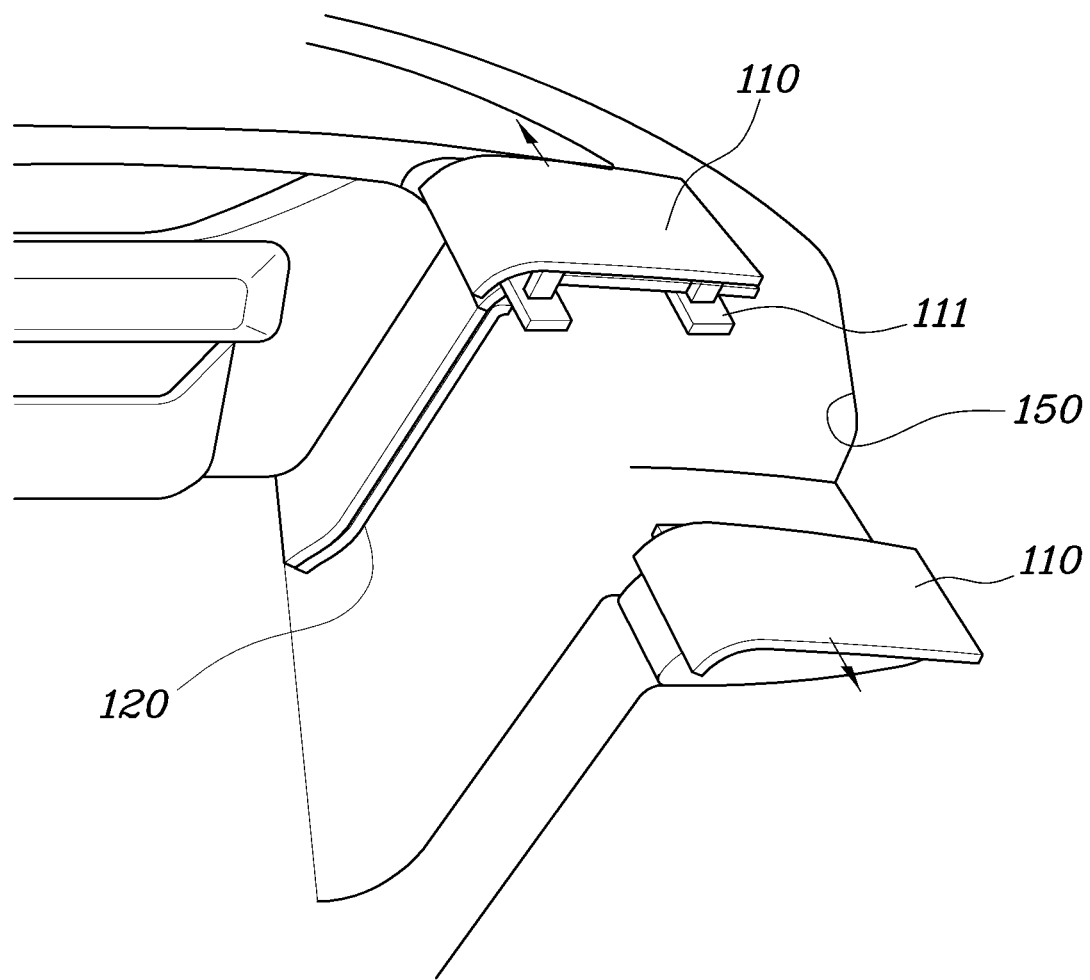
FIG. 5 is a view exemplarily illustrating a figure in which the instrument panels of the internal variable vehicle according to an exemplary embodiment of the present invention form an opening.

FIG. 4 is a perspective view of the instrument panels 100 of the internal variable vehicle according to an exemplary embodiment of the present invention and FIG. 5 is a view exemplarily illustrating a figure in which the instrument panels 100 of the internal variable vehicle according to an exemplary embodiment of the present invention form the opening 150.

Referring to FIG. 4 and FIG. 5, the instrument panel 100 may include a lower panel 120 forming a predetermined angle with the floor and an upper panel 110 provided on the lower panel 120. The lower panels 120 and the upper panels 110 may be opened by partially overlapping the lower panels 120 to each other and overlapping the upper panels 110 to each other, respectively, and when being opened, the outside of the vehicle and the internal space may be connected. The lower panels 120 and the upper panels 110 may be configured in a structure in which the lower panels 120 overlap each other and the upper panels 110 overlap each other, respectively, securing a space in which the opening 150 is to be formed by a simple and efficient structure in a narrow space.

As illustrated in FIG. 5, when the opening 150 is formed, the upper panels 110 may have a structure in which a portion thereof is stacked and overlapped on an upper portion of the remaining portion. As the upper panels 110 include both sides, the portion thereof may be stacked and overlapped on the upper portion of the remaining portion.

Furthermore, one or more support bars 111 may be provided on a lower surface of the upper panel 110. The support bars 111 are coupled to the lower surface of the upper panel 110 to reinforce a rigidity of the upper panel 110, configured to prevent the upper panel 110 from being damaged by an external impact. The support bars 111 are formed in a separate structure and may be separated together with the upper panel 110. In a case in which the upper panel 110 is folded, since the support bars 111 may also be separated and folded, there is an advantage that the rigidity may be reinforced without occupying a large space. One side of the separated portions of the support bar 111 may protrude and the other side thereof may be recessed inwardly. In the instant case, when the upper panels 110 are deployed, the support bars 111, which are separated into both sides, may be coupled to each other by a fitting structure. Furthermore, the support bar 111 may be formed in a telescopic structure so that a length thereof may be extended. The support bars 111 may be formed on the lower panels 120 to reinforce the rigidity of the lower panels 120.

In an exemplary embodiment of the present invention, a receiving space 115 is formed between the upper panel 110 and the support bars 111 so that the upper panel 110 and the support bars 111 is slidably coupled to a vehicle body through the receiving space 115.

As in the exemplary embodiment illustrated in FIG. 4, the lower panels 120 may be configured to overlap on both sides and as in the exemplary embodiment illustrated in FIG. 5, the lower panels 120 may be configured with a sliding structure which is opened or closed to one side thereof. The lower panels 120 may be formed while forming the predetermined angle with the floor, and thus may be formed with the sliding structure, forming an opening 150 with a simple structure.

According to an exemplary embodiment of the present invention, the opening that exposes the internal space of the vehicle to the outside is formed by folding the instrument panels, and the seat is accessible through the opening, making it possible to allow the vehicle to be directly connected to a living space.

Furthermore, the vehicle is docked in the building and the seat is directly moved to the living space, reducing travel time and minimizing the equipment in the living space, and since the fixing module has a simple structure, which may be easily manufactured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An internal variable vehicle comprising:

instrument panels provided on a side of an internal space of the vehicle, wherein a portion of the instrument panels is selectively overlapped, for forming an embedding portion of the internal space when being developed, or for forming an opening through which the internal space of the vehicle is externally exposed out of the vehicle when the portion thereof overlaps;

a seat movable to a predetermined location;

a guide provided on a floor of the vehicle, the floor forming the internal space, wherein a lower end portion of the seat is slidably coupled to the guide, and the guide provides a path in which the seat is movable from the internal space of the vehicle to an opening side of the instrument panels; and a fixing module configured of fixing the seat to a point of the guide and of releasing the fixing of the seat from the point of the guide when the seat is required to move to the outside of the vehicle through the opening of the instrument panels.

2. The internal variable vehicle of claim 1, further including a side step provided at a predetermined point of the vehicle where the opening is formed outside the vehicle and provided between the opening and a ground when the seat is configured to move to the outside of the vehicle, to assist the seat to be seated on the ground.

3. The internal variable vehicle of claim 2, wherein the side step is hingedly coupled to a side of the vehicle to form a portion of a vehicle body, and is hingedly rotated when being moved to form the opening.

4. The internal variable vehicle of claim 1, wherein the seat is provided with a driving member mounted into the guide, and is movable along the guide by the driving member when the fixing module releases the fixing of the seat.

5. The internal variable vehicle of claim 1, wherein the fixing module includes a fixing portion provided inside the floor and selectively fixing the seat to the floor.

6. The internal variable vehicle of claim 5, wherein the fixing portion of the fixing module is configured to protrude upwardly from the floor and to be coupled to a lower surface of the seat to fix the seat to the floor.

7. The internal variable vehicle of claim 1, wherein the guide is fixed to the floor by surrounding supports of the seat when the seat is fixed, and at least a portion of the guide is detached from the supports of the seat when the seat is released to release the fixing of the seat.

8. The internal variable vehicle of claim 1,
wherein the fixing module includes a position sensor, and
wherein in a response that the seat is positioned at the predetermined location according to a detection signal of the position sensor, the fixing module is configured to fix the seat to the floor.

9. The internal variable vehicle of claim 1, wherein the guide is formed on a side of the vehicle opposite to the opening to prevent interference by moving a neighboring seat adjacent to the seat moving to the outside of the vehicle, to a rear of the vehicle.

10. The internal variable vehicle of claim 1, wherein a distal end of the guide is branched into at least two paths in a direction opposite to the opening.

11. The internal variable vehicle of claim 1,
wherein the instrument panels include lower panels inclined in a predetermined angle with the floor and upper panels provided on the lower panels, and
wherein the upper panels and the lower panels form the opening by overlapping the upper panels to each other and overlapping the lower panels to each other, respectively.

12. The internal variable vehicle of claim 11, wherein when the opening is formed, a portion of the upper panels is stacked and overlapped on an upper portion of a remaining portion in the upper panels.

13. The internal variable vehicle of claim 11,
wherein lower surfaces of the upper panels are provided with one or more support bars separated into first and second sides to reinforce a rigidity of the upper panels, and
wherein the one or more support bars are separated when the upper panels are stacked and overlapped and are folded with the upper panels.

14. The internal variable vehicle of claim 11,
wherein lower surfaces of the upper panels are provided with one or more support bars, and
wherein the one or more support bars are formed in a telescopic structure so that a length thereof is selectively extendable.

15. The internal variable vehicle of claim 11,
wherein lower surfaces of the upper panels are provided with one or more support bars, and
wherein a receiving space is formed between the upper panels and the one or more support bars so that the upper panels and the support bars are slidably coupled to a vehicle body through the receiving space.

16. The internal variable vehicle of claim 13, wherein the lower panels are slidably mounted in a vehicle body and overlap in a direction to form the opening.

* * * * *